United States Patent
Terry

(10) Patent No.: US 7,408,904 B2
(45) Date of Patent: Aug. 5, 2008

(54) METHOD AND APPARATUS FOR REDUCING UPLINK AND DOWNLINK TRANSMISSION ERRORS BY SUPPORTING ADAPTIVE MODULATION AND CODING AND HYBRID AUTOMATIC REPEAT REQUEST FUNCTIONS

(75) Inventor: Stephen E. Terry, Northport, NY (US)

(73) Assignee: InterDigital Corporation, Wilmington, DE (US)

( * ) Notice: Subject to any disclaimer, the term of this patent is extended or adjusted under 35 U.S.C. 154(b) by 864 days.

(21) Appl. No.: 10/434,870

(22) Filed: May 9, 2003

(65) Prior Publication Data

US 2004/0009786 A1 Jan. 15, 2004

Related U.S. Application Data

(60) Provisional application No. 60/379,830, filed on May 10, 2002.

(51) Int. Cl.
*H04Q 7/00* (2006.01)
(52) U.S. Cl. .................. 370/337; 370/465; 714/748
(58) Field of Classification Search .............. None
See application file for complete search history.

(56) References Cited

U.S. PATENT DOCUMENTS

| | | | |
|---|---|---|---|
| 6,304,593 B1 | 10/2001 | Alouini et al. | |
| 6,308,294 B1 | 10/2001 | Ghosh et al. | |
| 6,381,231 B1 | 4/2002 | Silventoinen et al. | |
| 6,697,988 B2 * | 2/2004 | Kim et al. | 714/752 |
| 2003/0081692 A1 * | 5/2003 | Kwan et al. | 375/295 |
| 2003/0228876 A1 * | 12/2003 | Hwang | 455/522 |

FOREIGN PATENT DOCUMENTS

| | | |
|---|---|---|
| WO | WO 02/31916 A1 * | 4/2000 |
| WO | 01/91356 | 11/2001 |
| WO | 03/001681 | 1/2003 |

OTHER PUBLICATIONS

3GPP TS 25.214 v5.0.0, "3$^{rd}$ Generation Partnership Project; Technical Specification Group Radio Access Network; Physical Layer Procedures (FDD)", Release 5, Mar. 2002, pp. 1-56.
ETSI TS 125 211 v4.0.3, "Universal Mobile Telecommunications Systems (UMTS); Physical Channels and Mapping of Transport Channels onto Physical Channels (FDD)", 3GPP TS 25.211 version 4.3.0, Release 4, Dec. 2001, pp. 1-47.

* cited by examiner

*Primary Examiner*—Chau Nguyen
*Assistant Examiner*—Suk Jin Kang
(74) *Attorney, Agent, or Firm*—Volpe and Koenig, P.C.

(57) ABSTRACT

A method and apparatus for supporting Adaptive Modulation and Coding (AM&C) and Hybrid Automatic Repeat Request (H-ARQ) functions in a cellular system including at least one wireless transmit/receive unit (WTRU) and a Node B. A signal is received at the WTRU indicating a need for AM&C and H-ARQ control signaling. An AM&C and H-ARQ control signaling transport channel (TrCH) is dynamically allocated by informing a transport format selection process of the need for AM&C and H-ARQ control signaling. The transport format is selected for required transmission time intervals (TTIs) which assign transport format combinations (TFCs) to establish the AM&C and H-ARQ control signaling transport channel.

14 Claims, 4 Drawing Sheets

METHOD AND APPARATUS FOR REDUCING UPLINK AND DOWNLINK TRANSMISSION ERRORS BY SUPPORTING ADAPTIVE MODULATION AND CODING AND HYBRID AUTOMATIC REPEAT REQUEST FUNCTIONS

CROSS REFERENCE TO RELATED APPLICATION(S)

The application claims priority from Provisional Patent Application No. 60/379,830, filed May 10, 2002.

FIELD OF INVENTION

The present invention relates to the field of wireless communications. More specifically, the present invention relates to the reduction of uplink and downlink transmission errors in a third generation (3G) cellular system using Adaptive Modulation and Coding (AM&C) and Hybrid Automatic Repeat Request (H-ARQ) techniques applied through the use of at least one transport channel (TrCH)

BACKGROUND

In conventional third generation (3G) cellular systems, AM&C and HAR-Q techniques provide increased data rates and improved utilization of radio resources. Signaling between User Equipment (UE) and Base Stations (Node Bs) for the coordination of AM&C and H-ARQ functions is provided by physical control channels, such as High Speed Data Packet Access (HSDPA) control channels, or the like.

The number of bits allocated for a physical channel message is generally predetermined and restricted. As a result, an error detection scheme, such as a cyclic redundancy check (CRC), is not performed on a physical channel for either uplink or downlink signaling and is not available for use. A primary problem with ensuring successful transmission within the Medium Access Control (MAC) layer is the inability to detect and realize errors when they occur. When transmission errors occur on physical control channels in either the uplink or the downlink, such as with AM&C and H-ARQ control signaling, it is possible that transmission errors are not perceived by the physical layer (i.e. existing MAC layer data recovery mechanisms). Therefore, these MAC layer data recovery mechanisms are not initiated.

Accordingly, current 3G systems are not adequately configured to cope with the occurrence of errors on physical control channels. This results in a high probability of UE to Node B H-ARQ acknowledgements and channel quality indications for determination of AM&C to be misinterpreted, which further results in a loss of data within the MAC layer and inefficient use of radio resources.

When a loss of data occurs in the MAC layer, the Radio Link Control (RLC) layer initiates mechanisms to recover the lost data. One disadvantage of relying on the RLC layer to recover the data is the latency of transmission, since the round-trip delay of the retransmission is significantly longer than that of transmissions at the H-ARQ level. This results in large data buffering requirements in the UE and a reduction in data throughput.

Accordingly, for efficient use of radio resources, for a higher user Quality of Service (QoS) and for the MAC to successfully recover failed transmissions, it is necessary to maintain low error rates on the AM&C and H-ARQ control channels. The current use of physical channel control fields for AM&C and H-ARQ signaling severely limits the ability to maintain low error rates.

One example of a type of failure which is not detected during the physical control signaling is the misinterpretation of generated acknowledgement (ACK) messages and negative acknowledgement (NACK) messages. An ACK message indicates a successful transmission of a data block, while a NACK message indicates a failed transmission of a data block.

FIG. 1 illustrates a prior art system 100 in which a transmitter 105 generates and sends a data block 110 comprised of one or more protocol data units (PDU) to a receiver 115. The data block 110 is not received correctly by the receiver 115. Although, the receiver 115 generates a NACK message 120, this NACK message 120 is corrupted during transmission and is interpreted by the transmitter 105 as being an ACK message 122. Thus, the transmitter 105 is never made aware that a transmission failure has occurred, and continues with another transmission without recovering and retransmitting the failed data block 110. In this case of a NACK being misinterpreted as an ACK, recovery by the RLC is required. However, as aforementioned, the RLC takes a considerable amount of time to recover the data, which is undesirable.

FIG. 2 illustrates a prior art system 200 in which a transmitter 205 generates and sends a data block 210A to a receiver 215. The data block 210A is received correctly by the receiver 215. Although, the receiver 215 generates an ACK message 220, this ACK message 220 is corrupted during transmission and is interpreted by the transmitter 205 as being a NACK message. Thus, the transmitter 205 interprets that a failure has occurred and unnecessarily retransmits the data block 210B. In this case of an ACK being misinterpreted as a NACK, a failure is incorrectly indicated and an unnecessary retransmission is generated. This is an inefficient use of radio resources.

FIG. 3 illustrates a prior art system 300 in which a transmitter 305 generates and sends an allocation message 310 to a receiver 315, which is not received by the receiver 315 due to the great amount of corruption and/or interference. As a result, the receiver 315 fails to send a message back to the transmitter 305. In the interim, the transmitter 305 waits to receive a message back from the receiver 315, (i.e., an ACK or NACK message). The transmitter 305 is unaware that the receiver 315 did not receive the allocation message 310. Because the transmitter 315 is waiting to detect a message that never arrives, due to the great amount of corruption there is a high possibility that bit estimation and/or power threshold errors will cause noise 320 to be incorrectly be detected by transmitter 305 as being an ACK message, even though a failure exists.

Another example of a type of failure which is not detected during the physical control signaling is the misinterpretation of the channel quality indicator (CQI) which is sent as part of the AM&C process, as shown in the system 400 of FIG. 4. The receiver 415 receives a plurality of PDUs 410 and generates a CQI as an indication of the quality of the data being received by the receiver 415. The particular mechanism used to generate the CQI is outside the scope of the present invention and, accordingly, will not be described in detail herein. However, after the CQI 420 is generated it is transmitted from the receiver to the transmitter 405, which utilizes the CQI during the AM&C process to select the proper modulation and coding set (MCS).

As those of skill in the art would appreciate, if the CQI 420 is corrupted during the transmission of the CQI 420 from the receiver 415 to the transmitter 405, an incorrect or corrupted CQI 422 will be received by the transmitter 405 and utilized during the AM&C process. If the corrupted CQI 422 is incorrectly low, (erroneously indicating that channel conditions are poor), a more robust MCS than is necessary will be selected. This results in a waste of radio resources. Alternatively, if the corrupted CQI 422 is incorrectly high, (erroneously indicating that channel conditions are favorable), a less robust MCS than needed will be selected, subjecting the data transmissions to a high error rate.

These two types of failures, (i.e. H-ARQ signaling and AM&C signaling), illustrate several of the many signaling errors that may occur between the Node B and a UE.

In 3G cellular systems, a wide range of services are provided; from high data rate services such as video and Internet downloads, to low data rate services such as speech. Referring to FIG. 5, a plurality of user services is shown as individual data streams. These, individual data streams (i.e., user services) are assigned to respective transport channels A,B,C whereby the data streams are coded and multiplexed. Each respective transport channel A, B, C is assigned a specific coding rate and a specific transmission time interval (TTI). The coding rate determines the number of transmitted bits of the physical layer and the TTI defines the delivery period of the block of data to be transmitted. For example, the TTI may be, for example, 10, 20, 40 or 80 ms.

Multiple transport channels A, B, C are multiplexed together into a coded composite transport channel (CCTrCh) consisting of a common set of physical channels. Since the CCTrCh is made up of a plurality of transport channels A, B, C it may have a plurality of different coding rates and different TTIs.

For example, a first transport channel A may have a 20 ms TTI and a second transport channel B may have a 40 ms TTI. Accordingly, the formatting of the first transport channel A in the first 20 ms and the formatting of first transport channel A in the second 20 ms can change. In contrast, since the second transport channel B has a 40 ms TTI, the formatting, and hence the number of bits, are the same for each 20 ms period over the 40 ms TTI duration. It is important to note that all of the transport channels A, B, C are mapped to the CCTrCh on a TTI basis, using the smallest TTI within the CCTrCh.

Each individual data stream has an associated data rate, and each physical channel has an associated data rate. Although these data rates are related to each other, they are distinctly different data rates.

Once the smallest TTI within the CCTrCh has been established, it must be determined how many bits of data will be transmitted and which transport channels will be supported within a given TTI. This is determined by the formatting of the data. A Transport Format Combination (TFC) is applied to each CCTrCh based on the smallest TTI. This essentially specifies for each transport channel how much data is transmitted in a given TTI and which transport channels will coexist in the TTI.

A TFC Set (TFCS) is the set of all of the possible TFCs. If the propagation conditions do not permit all of the possible TFCs within the TFCS to be supported by the UE, a reduced set of TFCs which are supported by the UE is created. This reduced set is called a TFC subset. TFC selection is the process used to determine which data and how much data for each transport channel to map to the CCTrCh. A transport format combination indicator (TFCI) is an indicator of a particular TFC, and is transmitted to the receiver to inform the receiver which transport channels are active for the current frame. The receiver, based on the reception of the TFCIs, will be able to interpret which physical channels and which timeslots have been used. Accordingly, the TFCI is the vehicle which provides coordination between the transmitter and the receiver such that the receiver knows which physical transport channels have been used.

It would be desirable to minimize the need for RLC data recovery by maintaining low error rates on AM&C and H-ARQ control channels, rather than physical channels.

SUMMARY

The present invention is method and apparatus for supporting Adaptive Modulation and Coding (AM&C) and Hybrid Automatic Repeat Request (H-ARQ) functions in a wireless communication system. The AM&C and H-ARQ control signaling is performed on a transport channel. This enables the control signaling to be positively acknowledged. The positive acknowledgment also enables feedback regarding the quality of transmissions. As a result, control signaling is much more robust, and other functions, such as the selection of a modulation and coding set during AM&C, may be more accurately performed.

DETAILED DESCRIPTION OF THE PREFERRED EMBODIMENTS

Figure 1:
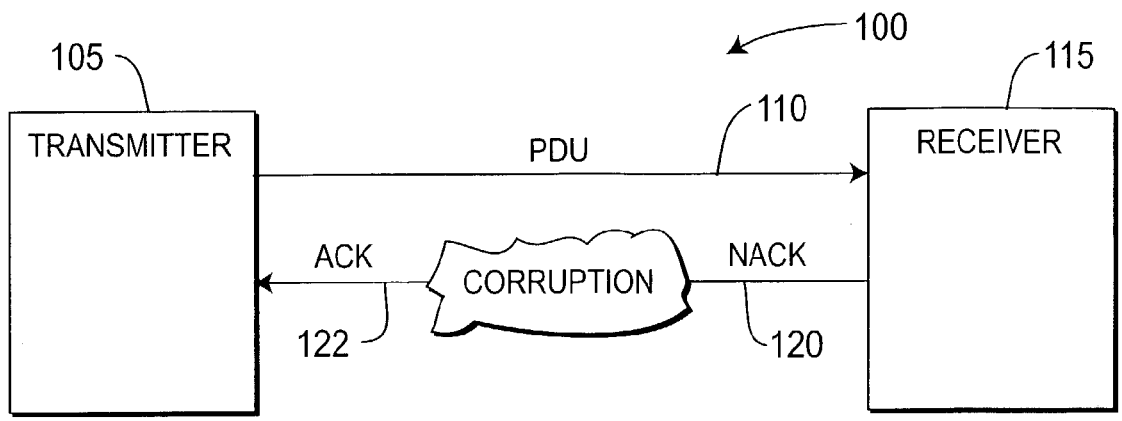
FIG. 1 is a prior art wireless communication system wherein a NACK is corrupted during transmission.

The preferred embodiments will be described with reference to the drawing figures where like numerals represent like elements throughout.

In accordance with several aspects of the present invention, a wireless communication system: 1) provides deterministic error detection for control signaling used for AM&C and H-ARQ processes by transmitting the control signaling over one or more transport channels; 2) uses CRC to determine control channel quality and correspondingly adjusts control channel attributes to achieve control channel quality targets; and 3) protects channel quality measurement and H-ARQ acknowledgements by implementing an error detection scheme in the control channels, such as with a CRC.

It should be understood by those of skill in the art that the foregoing description is applicable to both uplink and downlink applications. Additionally, although the present invention will be described with reference to the use of transport channels, it is applicable to other control signaling channels for support of AM&C and H-ARQ techniques which implement error detection and potentially variable signaling fields.

Figure 6:
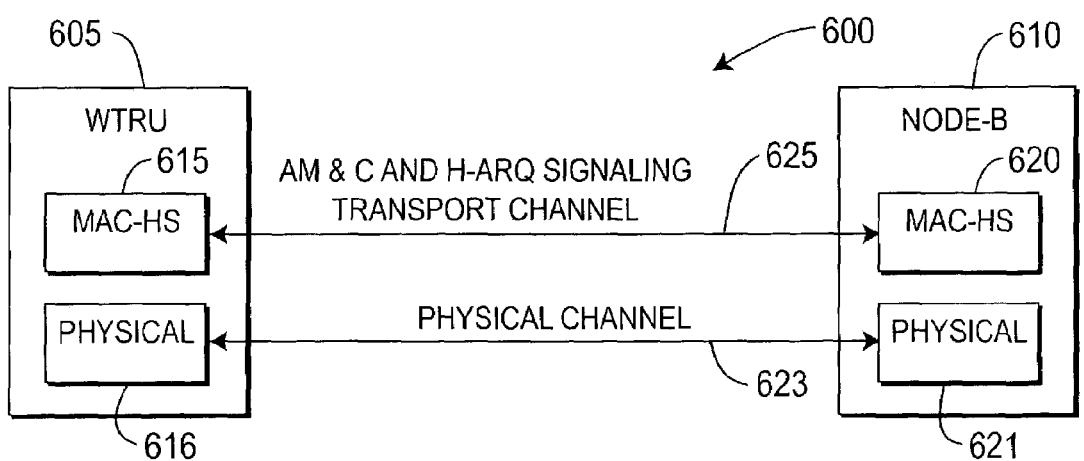
FIG. 6 is a UMTS operating in accordance with a preferred embodiment of the present invention wherein control signaling is performed over one or more transport channels.

FIG. 6 shows a Universal Mobile Telecommunications System (UMTS) 600 made in accordance with the present invention. The UMTS includes a wireless transmit/receive unit (WTRU) 605 and a Node B 610. The WTRU 605 includes a MAC entity 615 and a physical entity 616. The Node B 610 includes a MAC entity 620 and a physical entity 621. The MAC entity 615 in the WTRU 605 is the peer entity to the MAC entity 620 in the Node B 610. Likewise, the physical entity 616 in the WTRU 605 is the peer entity to the physical entity 621 in the Node B 610. As shown in FIG. 6, although a physical channel 623 with physical control signaling fields exists between physical entities 616, 621, in accordance with the present invention the AM&C and the H-ARQ control signaling is performed for uplink and/or downlink operation on one or more transport channels 625 which are terminated in the MAC entities 615, 620.

Performing the AM&C and H-ARQ signaling over one or more transport channels 625 provides much greater flexibility than the prior art scheme of performing the AM&C and H-ARQ signaling with physical channel control fields. As is well understood by those of skill in the art, physical channels comprise strictly defined fields that do not vary between transmissions. In contrast, transport channels are dynamically configured and include an error detection capability. Transport channels comprise a transport format set. In each TTI, a different transport format set may be selected and each transport format represents a different payload size. Variable control signaling may be supported. Accordingly, the transport channel may be tailored to each cell, each user, each signaling transmission or each release of the system.

Figure 2:
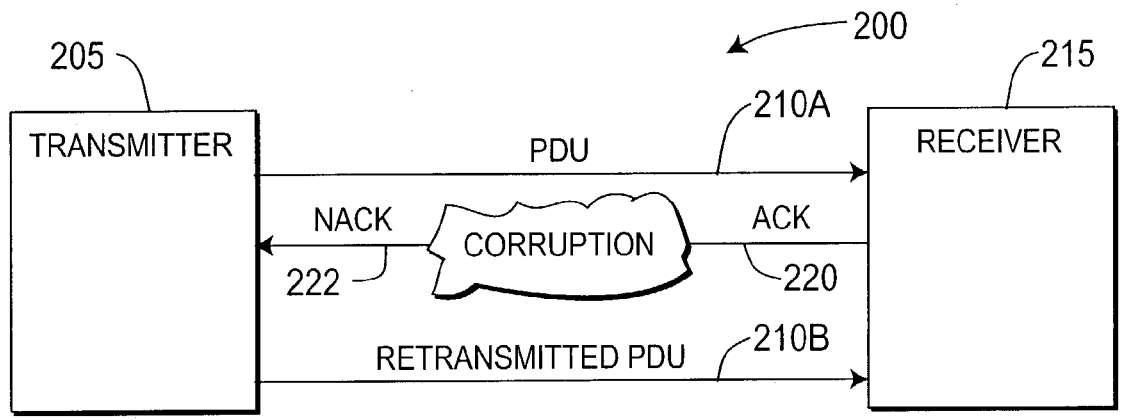
FIG. 2 is a prior art wireless communication system wherein an ACK is corrupted during transmission.
Figure 3:
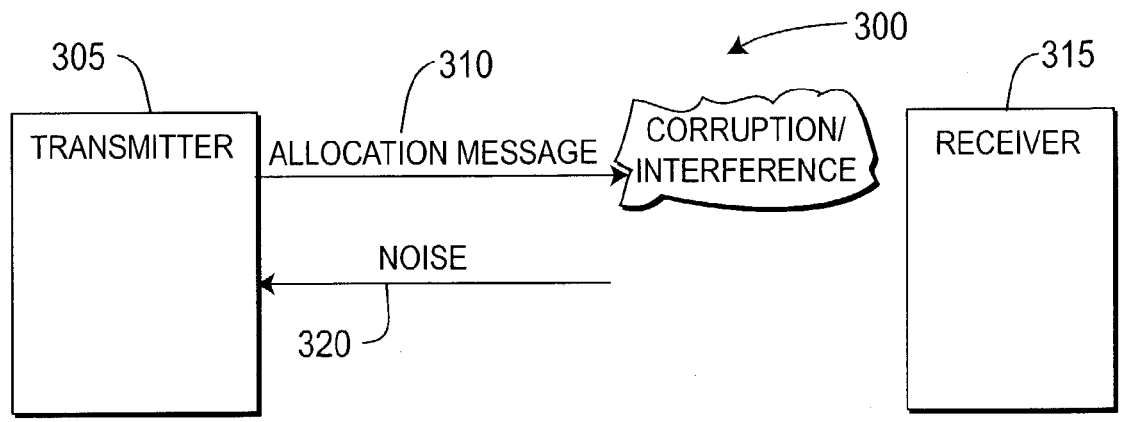
FIG. 3 is a prior art wireless communication system wherein an allocator message is corrupted during transmission and an ACK or NACK is never sent.

Utilizing the AM&C and H-ARQ signaling over one or more transport channels 625 provides several advantages over prior art systems. First, introduction of an error detection capability within the H-ARQ process results in a substantial reduction of ACK/NACK misinterpretations since a verification of the ACK/NACK is provided. This will avoid the three scenarios described with reference to FIGS. 1-3 and the problems resulting therefrom; such as inefficient utilization of the radio resources due to an ACK being misinterpreted as a NACK, and delay of the transmission of data during RLC data recovery as a result of an NACK being misinterpreted as an ACK.

Figure 4:
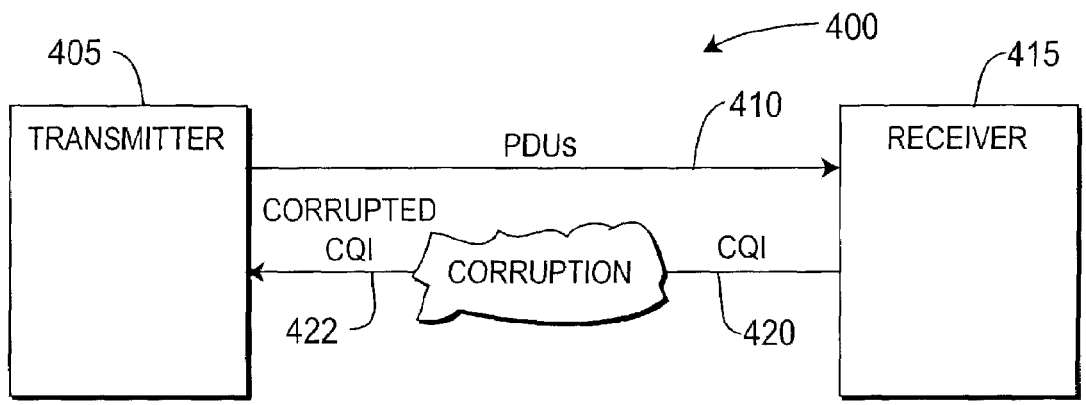
FIG. 4 is a prior art wireless communication system wherein an ACK is corrupted during transmission.
Figure 5:
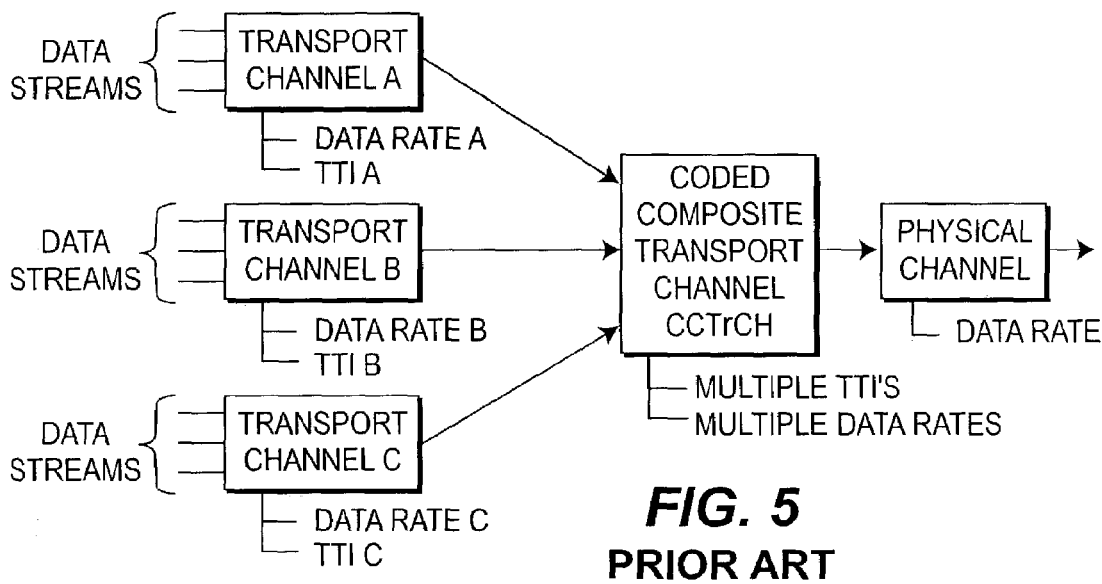
FIG. 5 is a prior art block diagram showing individual data streams being combined into a physical channel.

Second, introduction of an error detection capability in the AM&C process results in a substantial reduction of CQI misinterpretations due to corruption since a verification of the CQI is provided. This will avoid the scenario described with reference to FIG. 4. Since a correct CQI is critical to the selection of the proper MCS, in accordance with the present invention when the CQI is verified using an error tracking capability the integrity of the CQI will be maintained. As a result, the proper CQI value will be used during the AM&C process and the correct MCS will be selected. This results in a much more efficient utilization of the radio resources. Utilizing transport channels for control signaling enhances the ability to determine a proper MCS set. Since CQI errors are known, MCS selection is more accurate and physical resources are better utilized with reduced failures of user data transmissions.

Third, using transport channels in accordance with the present invention permits the quality of a control channel to be tracked, and the power and coding of the control channel, (either uplink or downlink), to be adjusted. The CRC provides a channel quality indication for the uplink and downlink control channels. The system can monitor the amount of errors that are received and, based upon those errors, adjust the transmit power and coding rate of the control channels to achieve proper AM&C and H-ARQ operation.

Figure 7:
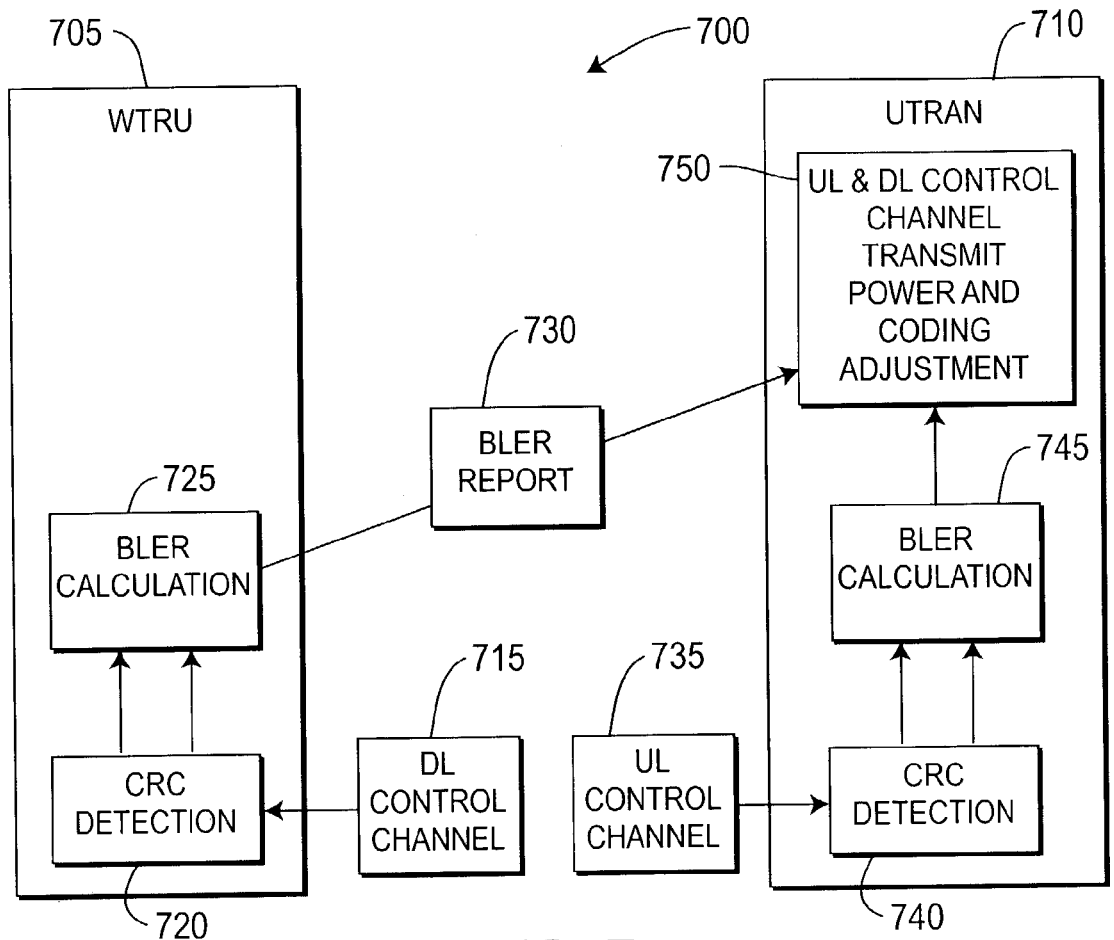
FIG. 7 is a system incorporating error detection therein for adjusting uplink and downlink control channel transmit power and coding.

FIG. 7 shows a system 700 including a WTRU 705 in communication with a Universal Terrestrial Radio Access Network (UTRAN) 710. Introduction of an error detection capability provides an indication of the number of errors that are occurring on the control channel during the control signaling, such as with a block error rate (BLER). The quality of the control channel can be adjusted according to the difference between the received BLER and the setting of a BLER target. In this manner, if a large number of errors are occurring (high BLER), the power of the control channel is increased. Likewise, if a small number of errors are occurring (low BLER), the power of the control channel is decreased.

Referring again to FIG. 7, a downlink control channel 715 is processed using an error detection scheme, such as CRC, in CRC detection entity 720. A BLER calculation 725 is performed on the output of the CRC detection entity 720 and a BLER report 730 is sent from the WTRU 705 to the UTRAN 710. Furthermore, an uplink control channel 735 is processed using an error detection scheme, such as CRC, in CRC detection entity 740. A BLER calculation 745 is performed on the output of CRC detection entity 740. The results of the BLER calculation 745 and the BLER report 730 are used to adjust uplink and downlink control channel transmit power and coding entity 750.

Not all transport channel attributes as currently defined are necessary to provide the benefits described hereinbefore. As understood by those of skill in the art, transport channels comprise both dynamic and semi-static attributes. Semi-static attributes are attributes that can be changed by Layer 3 signal (Radio Resource Control (RRC)) procedures. Dynamic attributes can be changed on a TTI basis by generating a different Transport Format Combination Indicator (TFCI). Semi-static attributes may include coding rate, CRC and TTI size. A dynamic attribute may be the transport block (payload) size. For this, a new type of transport channel is defined that is unique to AM&C and H-ARQ signaling requirements. Individual transmissions on transport channels exist within specific TTIs.

Figure 8:
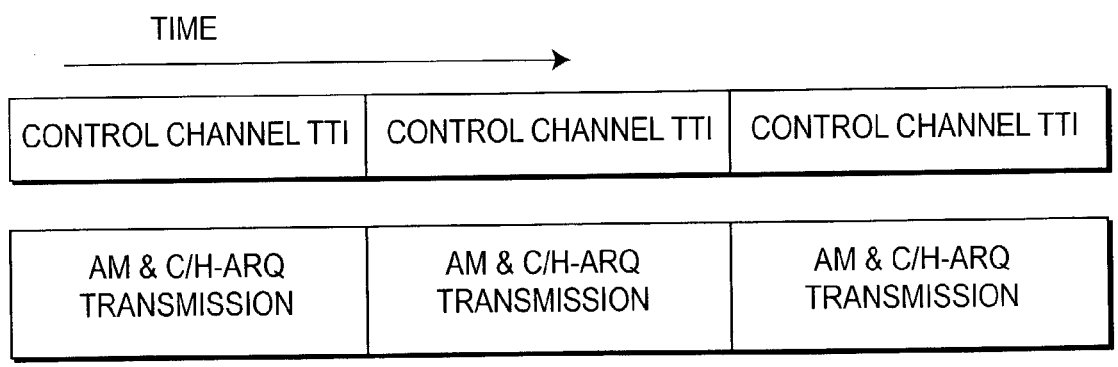
FIG. 8 shows control channels with TTIs aligned with AM&C/H-ARQ transmissions.

When AM&C and H-ARQ signaling is applied to transport channels, control channel TTIs can either be aligned with the current AM&C and H-ARQ physical channel signaling and physical channel allocations, or existing dedicated channels as shown in FIG. 8. Dedicated channel TTIs exist over longer periods than AM&C and H-ARQ channel allocation and signaling periods.

Figure 9:
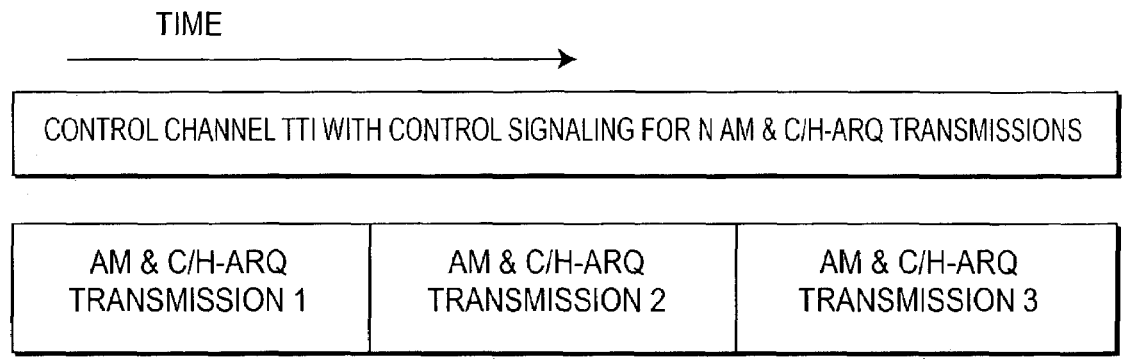
FIG. 9 shows control channel signaling for multiple AM&C/H-ARQ transmissions.

Referring to FIG. 9, if AM&C and H-ARQ signaling is applied to transport channels with TTIs that exist over periods longer than AM&C and H-ARQ signaling and channel allocation periods, then AM&C and H-ARQ transport channel signaling messages will encompass information related to several AM&C and H-ARQ channel allocations.

Each of the aforementioned transport channels has variable information fields from TTI to TTI. The fields incorporate a dynamic payload parameter, whereby a number of parameters of a variable payload may be increased (added) or decreased (removed) as needed. For example, using the TTIs, the amount of information that is signaled may be increased or decreased. This capability is useful in compensating for differences in different system program releases (e.g., RAN V, VI, VII) whereby one can change what is signaled by incorporating new features. Additionally, one may want to change the signaling used in particular cells of the system or for particular users.

In another example, for new allocations, it may be desired to use new fields that do not exist all of the time. Transport channels allow TTI fields to be varied to dynamically allocate new fields or vary the size of existing fields, which change what is signaled at any one time. One unique aspect of the transport channel is the TTI alignment. Present transport channels use a coded composite transport channel and each transport channel has a certain TTI. The present invention provides a transport channel that conveys this control information whereby TTIs are aligned with the AM&C and H-ARQ transmissions.

Figure 10:
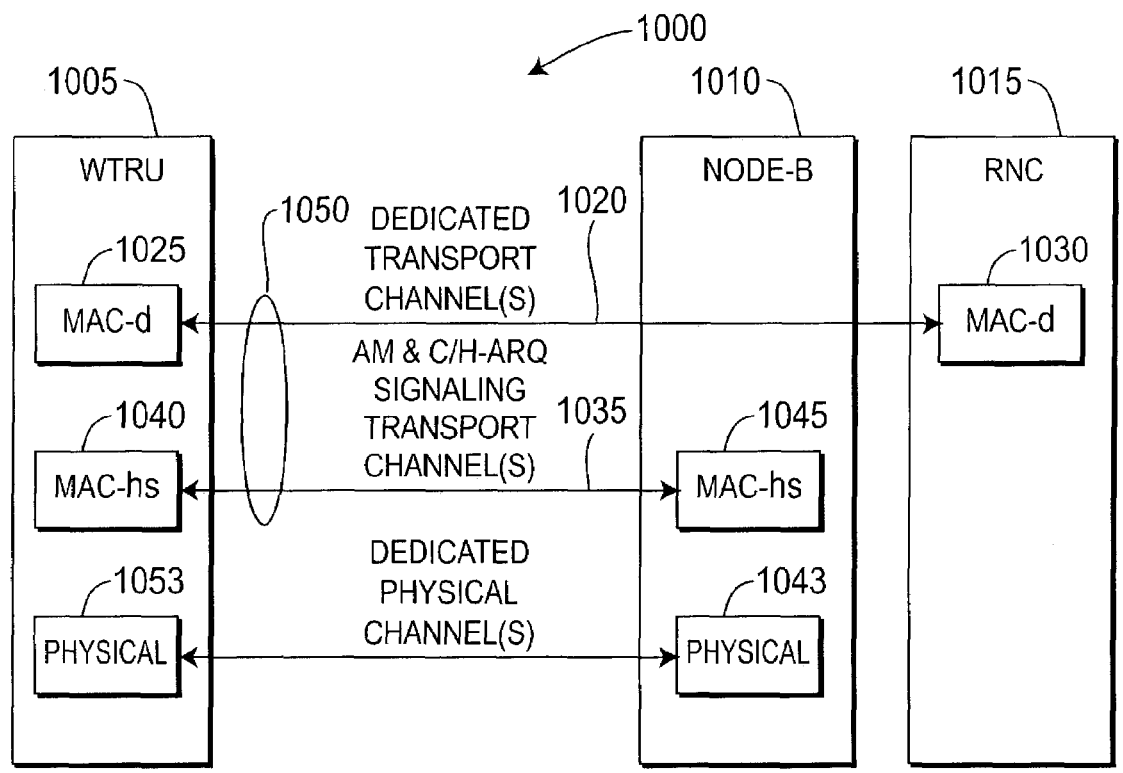
FIG. 10 is a UMTS with a dedicated CCTrCh with UE-Node B AM&C and H-ARQ signaling transport channel in accordance with an alternate embodiment of the present invention.

FIG. 10 shows a UMTS 1000 operating in accordance with an alternate embodiment of the present invention. The UMTS 1000 includes a WTRU 1005, a Node B 1010 and an RNC 1015, where the AM&C and H-ARQ signaling utilizes dedicated coded composite transport channels. Utilizing these dedicated channels for AM&C and H-ARQ signaling, minimizes the number of simultaneous channels that need to be supported.

The WTRU 1005 includes a MAC-hs entity 1040 and a physical entity 1053. The Node B 1010 also includes a MAC-hs entity 1045 and a physical entity 1043. Although prior art dedicated transport channels are terminated at the RNC, the transport channel in accordance with the present invention is terminated at the Node B 1010. At least one dedicated transport channel 1020 is currently terminated between MAC-d entities 1025, 1030 in the WTRU 1005 and the RNC 1015, respectively. Since AM&C and H-ARQ signaling over the transport channel 1035 exists between the WTRU 1005 and Node B 1010, where the AM&C and H-ARQ signaling transport channel 1035 is terminated between MAC-hs entities 1040, 1045, the present invention separates processing of the new AM&C and H-ARQ signaling transport channel 1035 in Node B 1010. A CCTrCH 1050 is formed by the combination of the at least one dedicated transport channel 1020 and the AM&C and H-ARQ signaling transport channel 1035.

In this embodiment, at least one TTI of a transport channel is aligned using a coded composite with the AM&C and H-ARQ transmissions. The new AM&C and H-ARQ control signaling transport channel 1035 is demultiplexed from the dedicated coded composite transport channel 1050 and routed to the MAC entity responsible for AM&C and H-ARQ processing in the Node B. The MAC entities located in the WTRU 1005 and the Node B 1015 invoke the AM&C and H-ARQ transmissions. When activation of the AM&C and H-ARQ transmissions is required, an indication is sent to an entity that performs TFC selection for the dedicated coded composite Transport channel. The MAC entities 1040, 1045 inform a dedicated coded composite MAC TFC selection function within the MAC-d entities 1025, 1030 so that a TFC is chosen that allocates the AM&C and H-ARQ control Transport channel within the TTI of the transport channel. Alternatively, for each TFC representing dedicated transport channel combinations, a second TFC is configured so that the MAC entity responsible for AM&C and H-ARQ processing can dynamically adjust the TFC to add the new control signaling transport channel 1035 as needed.

Rather than terminating in the RNC 1015, the present invention provides a transport channel existing between the WTRU 1005 and the Node B 1010. The new AM&C and H-ARQ control signaling transport channel 1035 may be part of the existing dedicated coded composite 1050, or it may be a new transport channel existing only between Node B 1010 and the WTRU 1005. The present invention enables the transport channel to be removed (demultiplexed) from the dedicated coded composite and terminated in Node B 1010 because it is known as a unique transport channel type or has a unique transport channel identity known to Node B 1010 and the WTRU 1005.

For the case where the transport channel is part of the existing dedicated coded composite, then a mechanism is in place where the MAC entities 1040, 1045 invoke the AM&C and H-ARQ transmissions. When the AM&C and H-ARQ transmissions become active, an indication is sent to the entity that performs TFC selection for the dedicated coded composite transport channel, which informs the dedicated coded composite MAC entity that uses the TFC that its transport channel will be active so that the proper TFC can be chosen. Alternatively, for each dedicated TrCH TFC, an additional TFC is defined that can replace the TFC chosen by the dedicated MAC entity 1040, 1045 at any time.

A concern with applying a new transport channel to the existing dedicated transport channel is that AM&C and H-ARQ control signaling is not continuous over time. Therefore, a mechanism that dynamically allocates the AM&C and H-ARQ transport channel improves utilization of dedicated physical resources.

Thus, in one embodiment of the present invention, the need for uplink or downlink control signaling is realized using the AM&C and H-ARQ MAC entities 1040, 1045. The MAC-d entities 1025, 1030 are informed so that a proper TFC is chosen to allow transmission on the new AM&C and H-ARQ transport channel. The AM&C and H-ARQ MAC entities 1040, 1045 then add the new TrCH for physical processing in that TTI.

In an alternative embodiment of the present invention, the AM&C and H-ARQ MAC entities 1040, 1045 adjust the TFC chosen by the MAC-d entities 1025, 1030 to include the new control signaling TrCH 1035 on an as needed basis.

In the uplink, the need for AM&C and H-ARQ control signaling is known in advance to the WTRU. In order to dynamically allocate the AM&C and H-ARQ signaling transport channel, when the need is realized, the transport format selection process is informed of the requirement. Subsequent transport format selection for the required TTIs assigns transport format combinations to establish the AM&C and H-ARQ signaling transport channel.

While the present invention has been described in terms of the preferred embodiment, other variations which are within the scope of the invention as outlined in the claims below will be apparent to those skilled in the art.

What is claimed is:

1. A method for supporting adaptive modulation and coding (AM&C) and hybrid automatic repeat request (H-ARQ) functions, the method comprising:

receiving at a wireless transmit/receive unit (WTRU) a signal indicating a need for AM&C and H-ARQ control signaling;

dynamically allocating at least one AM&C and H-ARQ signaling transport channel by informing a transport format selection process of the need for AM&C and H-ARQ control signaling;

selecting a transport format set for required transmission time intervals (TTIs) of the transport channel which assign transport format combinations (TFCs) to establish the AM&C and H-ARQ signaling transport channel; and aligning control channel TTIs with AM&C and H-ARQ transmissions on the AM&C and H-ARQ signaling transport channel such that each control channel TTI begins and ends at the same time as a corresponding AM&C and H-ARQ transmission.

2. The method of claim 1 further comprising changing dynamic attributes of the transport channel on a TTI basis by generating a transport format combination indicator (TFCI).

3. The method of claim 2 wherein the dynamic attributes of the transport channel include a payload size.

4. The method of claim 1 further comprising changing semi-static attributes of the transport channel using radio resource control (RRC) procedures.

5. The method of claim 4 wherein the semi-static attributes of the transport channel include a coding rate.

6. The method of claim 4 wherein the semi-static attributes of the transport channel include a TTI size.

7. The method of claim 4 wherein the semi-static attributes of the transport channel include a cyclic redundancy check (CRC).

8. A wireless communication apparatus comprising:
   a receiver for receiving at a wireless transmit/receive unit (WTRU) a signal indicating a need for adaptive modulation and coding (AM&C) and hybrid automatic repeat request (H-ARQ) control signaling;
   an allocator for dynamically allocating at least one AM&C and H-ARQ signaling transport channel by informing a transport format selection process of the need for AM&C and H-ARQ control signaling;
   a selector for selecting a transport format set for required transmission time intervals (TTIs) of the transport channel which assign transport format combinations (TFCs) to establish the AM&C and H-ARQ signaling transport channel; and
   an aligner for aligning control channel TTIs with AM&C and H-ARQ transmissions on the AM&C and H-ARQ signaling transport channel such that each control channel TTI begins and ends at the same time as a corresponding AM&C and H-ARQ transmission.

9. The apparatus of claim 8 wherein the allocator changes dynamic attributes of the transport channel on a TTI basis by generating a transport format combination indicator (TFCI).

10. The apparatus of claim 9 wherein the dynamic attributes of the transport channel include a payload size.

11. The apparatus of claim 8 wherein the allocator changes semi-static attributes of the transport channel using radio resource control (RRC) procedures.

12. The apparatus of claim 11 wherein the semi-static attributes of the transport channel include a coding rate.

13. The apparatus of claim 11 wherein the semi-static attributes of the transport channel include a TTI size.

14. The apparatus of claim 11 wherein the semi-static attributes of the transport channel include a cyclic redundancy check (CRC).

* * * * *